(12) United States Patent
Maezawa et al.

(10) Patent No.: US 8,421,965 B2
(45) Date of Patent: Apr. 16, 2013

(54) LIQUID CRYSTAL PANEL HAVING A MULTI-GAP STRUCTURE AND LIQUID CRYSTAL DISPLAY APPARATUS

(75) Inventors: Shouhei Maezawa, Osaka (JP); Masatoshi Tomonaga, Osaka (JP); Hiroyuki Takemoto, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 220 days.

(21) Appl. No.: 12/376,512

(22) PCT Filed: May 19, 2008

(86) PCT No.: PCT/JP2008/059132
§ 371 (c)(1),
(2), (4) Date: Feb. 5, 2009

(87) PCT Pub. No.: WO2009/008218
PCT Pub. Date: Jan. 15, 2009

(65) Prior Publication Data
US 2010/0231832 A1 Sep. 16, 2010

(30) Foreign Application Priority Data
Jul. 12, 2007 (JP) .................................. 2007-183323

(51) Int. Cl.
*G02F 1/1335* (2006.01)
*G02F 1/1333* (2006.01)
(52) U.S. Cl.
USPC ........... 349/107; 349/108; 349/117; 349/141; 349/96

(58) Field of Classification Search .................. 349/107, 349/108, 117, 141, 96
See application file for complete search history.

(56) References Cited

U.S. PATENT DOCUMENTS

| | | | |
|---|---|---|---|
| 6,025,894 A * | 2/2000 | Shirasaki et al. | 349/69 |
| 6,201,592 B1 * | 3/2001 | Terashita et al. | 349/156 |
| 6,346,932 B1 * | 2/2002 | Maeda | 345/90 |
| 6,384,889 B1 * | 5/2002 | Miyachi et al. | 349/143 |
| 6,661,484 B1 * | 12/2003 | Iwai et al. | 349/107 |
| 6,842,207 B2 * | 1/2005 | Nishida et al. | 349/107 |
| 6,965,419 B2 | 11/2005 | Nishida et al. | |
| 7,139,054 B2 | 11/2006 | Nishida et al. | |
| 7,405,785 B2 | 7/2008 | Nishida et al. | |
| 7,625,612 B2 | 12/2009 | Ohmori et al. | |
| 7,697,095 B2 * | 4/2010 | Toyama et al. | 349/119 |

(Continued)

FOREIGN PATENT DOCUMENTS

| | | |
|---|---|---|
| CN | 1270326 A | 10/2000 |
| CN | 1438528 A | 8/2003 |

(Continued)

OTHER PUBLICATIONS

International Search Report of PCT/JP2008/059132, mailing date of Aug. 19, 2008.

(Continued)

*Primary Examiner* — Mike Qi
(74) *Attorney, Agent, or Firm* — Westerman, Hattori, Daniels & Adrian, LLP

(57) ABSTRACT

The present invention provides a color liquid crystal panel in an e-mode of an IPS mode, which has a multi-gap structure, and in which a contrast in an oblique direction is enhanced.

15 Claims, 8 Drawing Sheets

U.S. PATENT DOCUMENTS

| | | | |
|---|---|---|---|
| 7,760,293 B2 | 7/2010 | Ito | |
| 2001/0002231 A1 | 5/2001 | Erickson et al. | |
| 2002/0030780 A1 | 3/2002 | Nishida et al. | |
| 2004/0252260 A1 | 12/2004 | Nishida et al. | |
| 2005/0280755 A1 | 12/2005 | Nishida et al. | |
| 2006/0177607 A1* | 8/2006 | Ohmori et al. | 428/1.31 |
| 2006/0227264 A1 | 10/2006 | Noda | |
| 2006/0274249 A1 | 12/2006 | Nishida et al. | |
| 2007/0002231 A1* | 1/2007 | Lee et al. | 349/117 |
| 2009/0115940 A1 | 5/2009 | Ito | |
| 2009/0231519 A1 | 9/2009 | Toyama et al. | |
| 2010/0182550 A1* | 7/2010 | Maezawa et al. | 349/107 |

FOREIGN PATENT DOCUMENTS

| | | |
|---|---|---|
| CN | 1818723 A | 8/2006 |
| JP | 11-014978 A | 1/1999 |
| JP | 2004-354745 A | 12/2004 |
| JP | 2006-259396 A | 9/2006 |
| JP | 2007-011331 A | 1/2007 |
| JP | 2007-114449 A | 5/2007 |
| KR | 1020060107302 A | 10/2006 |
| KR | 1020070003534 A | 1/2007 |
| TW | 200722869 A | 6/2007 |

OTHER PUBLICATIONS

Chinese Office Action dated Aug. 3, 2011, issued in corresponding Chinese Patent Application No. 200880000921.0.

Taiwanese Office Action dated Jun. 18, 2012, issued in corresponding Taiwanese Patent Application No. 097120614.

Japanese Office Action dated Sep. 19, 2012, issued in corresponding Japanese Patent Application No. 2008-123350, with English translation (5 pages).

* cited by examiner

LIQUID CRYSTAL PANEL HAVING A MULTI-GAP STRUCTURE AND LIQUID CRYSTAL DISPLAY APPARATUS

TECHNICAL FIELD

The present invention relates to a liquid crystal panel, and more specifically to a liquid crystal panel in which a contrast in an oblique direction is enhanced. The present invention also relates to a liquid crystal display apparatus with the liquid crystal panel.

BACKGROUND ART

A liquid crystal cell used in a liquid crystal display apparatus capable of displaying a color image mostly performs a color display by additive color mixture, using a color filter of three primary colors: red, green, and blue. However, the refractive index of light in liquid crystal varies depending upon the color, so that there arises a problem called a color shift in that a screen of a liquid crystal display apparatus looks in different colors depending upon the viewing angle when the liquid crystal display apparatus is viewed from an oblique direction. In order to prevent such a color shift, a liquid crystal cell having a multi-gap structure has been proposed. This liquid crystal cell uses a technology in which the thickness of a liquid crystal layer, i.e., the cell gap is varied depending upon the color. However, even when a liquid crystal cell having a multi-gap structure is used, a low contrast, which is a defect of the liquid crystal display apparatus, cannot be improved. As a technology of improving the contrast, there has been proposed a technology in which a light-shielding film is placed in an inclination area positioned at a boundary between a region in which the cell gap is larger and a region in which the cell gap is smaller (for example, Patent Document 1). This is a technology of preventing the decrease in contrast caused by light transmitting through or reflecting from the inclination area.

On the other hand, in a liquid crystal display apparatus used in a television receiver requiring an animation display or the like, a VA system and an IPS mode have become a mainstream recently, instead of a TN system and a STN system. Of those, according to the IPS mode, liquid crystal molecules contained in a liquid crystal layer are homogeneously aligned, and the alignment direction is changed in a plane thereof. Thus, the liquid crystal molecules do not rise obliquely in a liquid crystal cell, so that a change in optical properties depending upon the viewing angle of a screen is small, and a wider viewing angle compared with that according to the VA system is obtained. On the other hand, there is a problem that a contrast is lower than that according to the VA system. The IPS mode includes a system called an e-mode and a system called an o-mode. Of those, in the e-mode, a polarizer placed on a light source side, i.e., on a liquid crystal layer side of a liquid crystal cell directs an absorption axis thereof in a direction substantially perpendicular to a major axis direction of the liquid crystal molecules aligned homogeneously under no voltage application. Therefore, linearly polarized light generated when light in an omniazimuth emitted from a light source passes through the polarizer becomes elliptically polarized light while passing through the liquid crystal molecules whose major axis direction is perpendicular to the linearly polarized light. Therefore, when the elliptically polarized light passes through the polarizer whose absorption axis is directed in a direction substantially parallel to the major axis direction of the liquid crystal molecules, a contrast in an oblique direction decreases.

Patent Document 1: JP 2004-354745 A

DISCLOSURE OF THE INVENTION

Problem to be Solved by the Invention

If the technology of Patent Document 1 is applied to the liquid crystal panel of an e-mode of an IPS mode, the decrease in contrast caused by the transmission or reflection of light in an inclination area is suppressed. On the other hand, the decrease in contrast in an oblique direction caused by the conversion of the linearly polarized light into the elliptically polarized light is not improved.

The present invention has been made in view of the above-mentioned situation, and an object of the present invention is to provide a color liquid crystal panel in an e-mode of an IPS mode, which has a multi-gap structure, and which has been well modified in such a way that the decrease in contrast in an oblique direction caused by the conversion of linearly polarized light into elliptically polarized light can be suppressed, and a liquid crystal display apparatus including such a liquid crystal panel.

Means for Solving the Problems

A liquid crystal panel according to the present invention includes: a liquid crystal cell having a plurality of color filters having different colors and a liquid crystal layer which is provided in contact with the plurality of color filters, in which different thicknesses are set depending upon a region in contact with each of the plurality of color filters, and which further contains liquid crystal molecules aligned homogeneously; a first polarizer which is provided on a side of the plurality of color filters of the liquid crystal cell, and whose absorption axis is directed in a direction substantially parallel to a major axis direction of the liquid crystal molecules under no voltage application; a second polarizer which is provided on a side of the liquid crystal layer of the liquid crystal cell and whose absorption axis is directed in a direction substantially perpendicular to the major axis direction of the liquid crystal molecules; and a retardation film which is provided between the first polarizer and the plurality of color filters, and whose in-plane direction refractive index is substantially uniform and whose thickness direction refractive index is smaller than the in-plane direction refractive index.

According to the above configuration, a retardation film in which an in-plane direction refractive index is substantially uniform and which has a thickness direction refractive index smaller than the in-plane direction refractive index is provided between the first polarizer and the plurality of color filters. Therefore, the light that becomes elliptically polarized light by passing through a liquid crystal layer is converted into linearly polarized light, whereby the contrast in an oblique direction is enhanced. The in-plane direction refers to each direction in a plane perpendicular to the thickness direction of the retardation film.

Further, the color filter is a member provided in a liquid crystal cell so as to perform a color display, and includes a resin film containing a dye and/or a pigment. The color filter includes those which are composed of only a resin film containing a dye and/or a pigment, and those which further have an overcoat layer protecting the resin film.

In the liquid crystal panel according to the present invention, it is preferred that the thickness of a liquid crystal layer be set in accordance with each thickness of a plurality of color filters.

According to the above configuration, the thickness of the liquid crystal layer is set corresponding to each thickness of the plurality of color filters. Therefore, the thickness of the liquid crystal layer can be set by setting each thickness of the plurality of color filters. Thus, it is easy to optimize the retardation of light in a liquid crystal layer cell depending upon the light color.

It is preferred that a plurality of color filters of a liquid crystal panel according to the present invention be composed of a blue color filter, a green color filter, and a red color filter, the thickness of a liquid crystal layer in a region in contact with the blue color filter be smaller than that of the liquid crystal layer in a region in contact with the green color filter and the red color filter, and the thickness of the liquid crystal layer in a region corresponding to the green color filter be equal to or smaller than the thickness of the liquid crystal layer in a region corresponding to the red color filter.

According to the above configuration, the thickness of the liquid crystal layer in contact with the blue color filter is smaller than that of the liquid crystal layer in contact with the green color filter and the red color filter. Therefore, the retardation in phase of blue light can be made smaller than that of green and red light. Further, the thickness of the liquid crystal layer corresponding to the green color filter is equal to or smaller than that of the liquid crystal layer corresponding to the red color filter. Therefore, the retardation in phase of green light can be set to be equal to or smaller than that of red light. This can suppress a color shift in an oblique direction.

The liquid crystal panel according to the present invention is a liquid crystal panel, in which an in-plane retardation value Re[550] of the liquid crystal cell with respect to light with a wavelength of 550 nm that is green light is represented by $$Re[550]=(nx_{550}-ny_{550}) \times d_G \qquad (1)$$

where $nx_{550}$ is a principal refractive index in a slow axis direction in a plane of the liquid crystal layer with respect to light with a wavelength of 550 nm, $ny_{550}$ is a principal refractive index in a fast axis direction in a plane of the liquid crystal layer with respect to light with a wavelength of 550 nm, and $d_G$ is a thickness of the liquid crystal layer in a region in contact with the green color filter;

an in-plane retardation value Re[450] of the liquid crystal cell with respect to light with a wavelength of 450 nm that is blue light is represented by $$Re[450]=(nx_{450}-ny_{450}) \times d_B \qquad (2)$$

where $nx_{450}$ is a principal refractive index in a slow axis direction in a plane of the liquid crystal layer with respect to light with a wavelength of 450 nm, $ny_{450}$ is a principal refractive index in a fast axis direction in a plane of the liquid crystal layer with respect to light with a wavelength of 450 nm, and $d_B$ is a thickness of the liquid crystal layer in a region in contact with the blue color filter; and the in-plane retardation value Re[550] and the in-plane retardation value Re[450] preferably satisfy a relationship of $$Re[450]<Re[550] \qquad (3).$$

According to the above configuration, the in-plane retardation value Re[550] and the in-plane retardation value Re[450] of the liquid crystal layer satisfy the relationship of Expression (3). Therefore, green light passing through the liquid crystal layer causes a retardation in phase with respect to blue light. This can offset the retardation in phase of blue light with respect to green light caused in a retardation film. The in-plane retardation value refers to a retardation value between a slow axis and a fast axis in a plane perpendicular to a thickness direction of the liquid crystal layer. Further, the slow axis refers to a direction in which a principal refractive index is largest in an identical plane, and the fast axis refers to a direction perpendicular to the slow axis.

The liquid crystal panel according to the present invention is a liquid crystal panel, in which a thickness direction retardation value Rth[550] of the retardation film with respect to light with a wavelength of 550 nm that is green light is represented by $$Rth[550]=(nx_{550}-nz_{550}) \times d \qquad (4)$$

where $nx_{550}$ is a principal refractive index in a slow axis direction in a plane of the retardation film with respect to light with a wavelength of 550 nm, $nz_{550}$ is a principal refractive index in a thickness direction of the retardation film with respect to light with a wavelength of 550 nm, and d is a thickness of the retardation film; and the retardation value Rth[550] preferably is in a range of $$20 \text{ nm} \leq Rth[550] \leq 80 \text{ nm} \qquad (5).$$

When the Rth[550] of the retardation film is smaller than 20 nm, a contrast in an oblique direction may decrease. When the Rth[550] is larger than 80 nm, a color shift in an oblique direction may increase. Thus, according to the above configuration, the Rth[550] is 20 nm to 80 nm, so that the contrast in an oblique direction can be enhanced while the color shift in an oblique direction is suppressed.

The liquid crystal panel according to the present invention can be preferably used in a liquid crystal display apparatus.

Effects of the Invention

According to the present invention, the color liquid crystal panel in an e-mode of an IPS mode can be provided, which has a multi-gap structure, and in which the contrast in an oblique direction is enhanced.

DESCRIPTION OF SYMBOLS

1 . . . first polarizer, 2 . . . retardation film (negative C plate), 3 . . . glass substrate (color filter substrate), 5 . . . liquid crystal layer, 6 . . . color filter, 6B . . . blue color filter, 6G . . . green color filter, 6R . . . red color filter, 7 . . . glass substrate (active matrix substrate), 8 . . . second polarizer, 10 . . . liquid crystal cell, 41 . . . point, 42 . . . point, 43 . . . straight line, 80 . . . backlight unit, 81 . . . light source, 82 . . . reflective film, 83 . . . diffusion plate, 84 . . . prism sheet, 85 . . . brightness enhancing film, 200 . . . liquid crystal panel, 300 . . . liquid crystal display apparatus

DETAILED DESCRIPTION OF THE INVENTION

Hereinafter, one embodiment of a liquid crystal panel and a liquid crystal display apparatus embodying the present invention will be described with reference to FIGS. 1 to 5.

Figure 1:
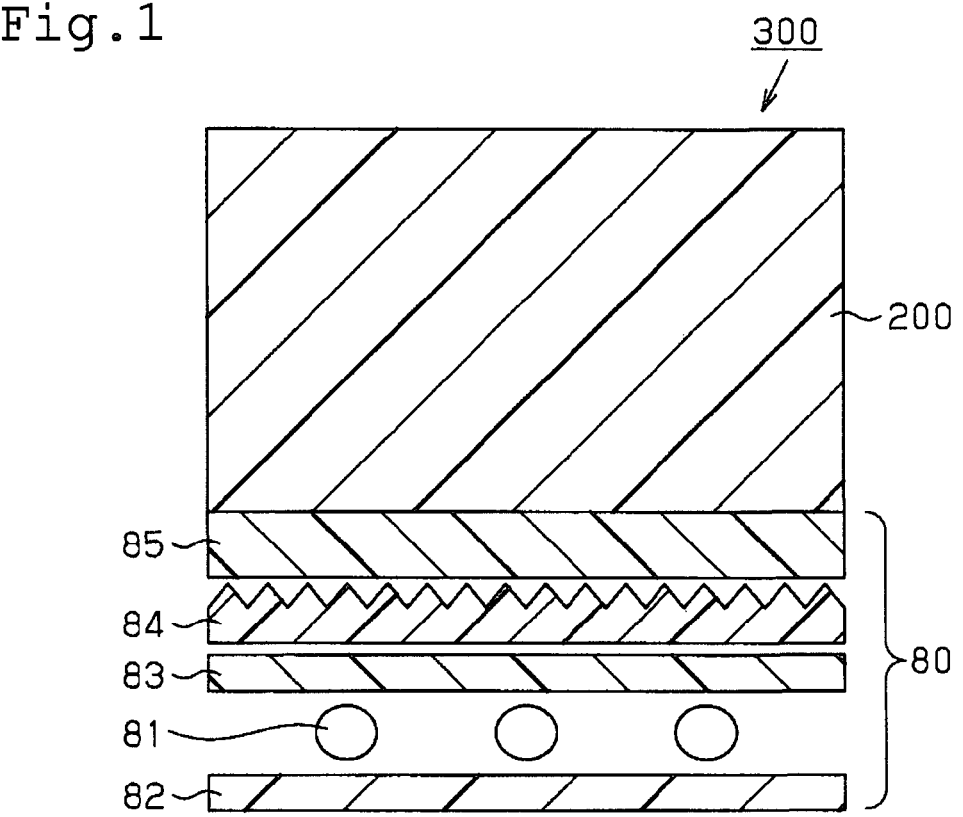
FIG. 1 A schematic cross-sectional view showing one embodiment of a liquid crystal display apparatus according to the present invention.

FIG. 1 is a schematic cross-sectional view of a liquid crystal display apparatus of the present embodiment. A liquid crystal display apparatus 300 includes at least a liquid crystal panel 200 and a backlight unit 80 placed on one side of the liquid crystal panel 200.

In the case where a direct-lighting type is adopted, the backlight unit 80 preferably includes at least a light source 81, a reflective film 82, a diffusion plate 83, a prism sheet 84, and a brightness enhancing film 85. Specifically, the backlight unit 80 is configured so that the light source 81 is interposed between the reflective film 82 and the diffusion plate 83, and the prism sheet 84 and the brightness enhancing film 85 are laminated in this order on a side of the diffusion plate 83 opposite to the light source 81. A liquid crystal panel 200 is laminated on the brightness enhancing film 85 of the backlight unit 80 with such a configuration, whereby a liquid crystal display apparatus is configured. Due to such a configuration, a part of light projected from the light source 81 directly reaches the diffusion plate 83, and the other part of the projected light reaches the diffusion plate 83 after being reflected by the reflective film 82. Then, the light reaches the liquid crystal panel 200 further through the prism sheet 84 and the brightness enhancing film 85.

Figure 2:
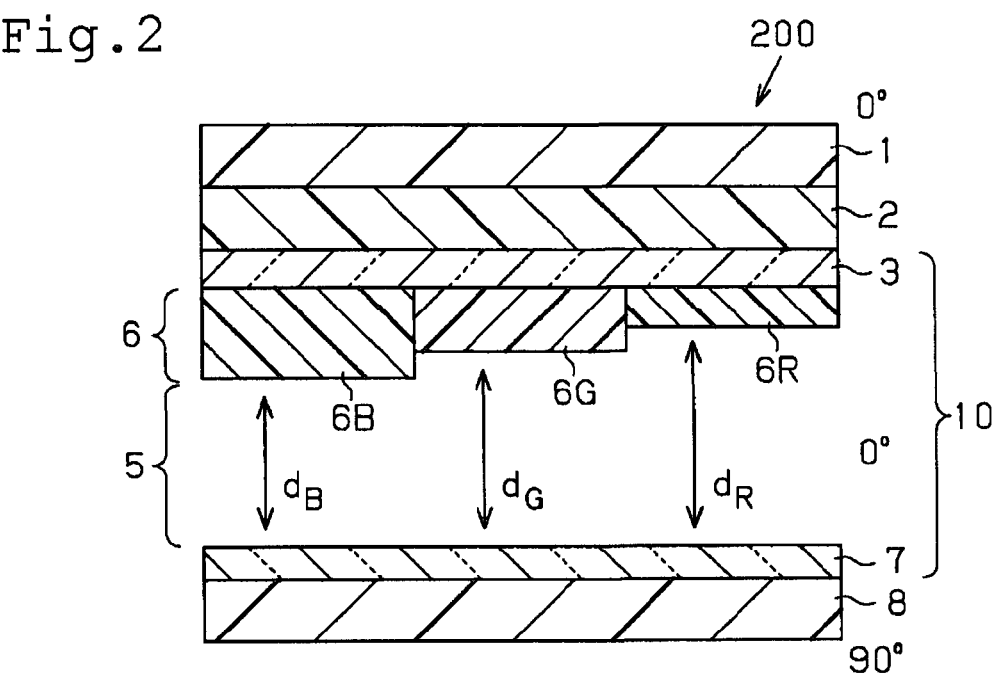
FIG. 2 An enlarged view of FIG. 1, which is a schematic cross-sectional view showing one embodiment of a liquid crystal panel according to the present invention.

As shown in FIG. 2, the liquid crystal panel 200 is configured in such a manner that a second polarizer 8, a liquid crystal cell 10, a retardation film 2, and a first polarizer 1 are laminated in this order. Each layer can be laminated via any suitable adhesion layer. Examples of the adhesion layer include a pressure-sensitive adhesive layer and an adhesive layer. The liquid crystal panel 200 is laminated on the backlight unit 80 so that the second polarizer 8 is placed on the backlight unit 80 side.

The liquid crystal cell 10 has a configuration in which a color filter 6 is laminated on the glass substrate 3 on a viewer side, and a liquid crystal layer 5 is interposed between the color filter 6 and the glass substrate 7 on the backlight side. The retardation film 2 and the first polarizer 1 are provided on the color filter 6 side (viewer side) of the liquid crystal cell 10. Further, the second polarizer 8 is provided on the liquid crystal layer 5 side (backlight side) of the liquid crystal cell 10.

The color filter 6 is composed of a blue color filter 6B, a green color filter 6G, and a red color filter 6R, the thickness of which decreases in this order. The distance between the glass substrate 3 and the glass substrate 7 is constant, so that the thickness of the liquid crystal layer 5 is set so as to correspond to the thickness of each of a plurality of color filters. Therefore, regarding the thickness of the liquid crystal layer 5, a thickness $d_B$ of a region in contact with the surface of the blue color filter 6B is smallest, and a thickness $d_G$ of a region in contact with the surface of the green color filter 6G and a thickness $d_R$ of a portion corresponding to a region in contact with the surface of the red color filter 6R increase in this order. That is, the liquid crystal cell 10 has a multi-gap structure having the liquid crystal layer 5 in which the different thicknesses are set depending upon the region in contact with a plurality of color filters. The thickness $d_B$ is preferably 2.5 μm or more and less than 3.3 μm. The thickness $d_G$ is preferably 3.3 μm to 3.8 μm. The thickness $d_R$ is preferably 3.3 μm to 4.0 μm.

As the color filters, any suitable filters can be used as long as they have three primary colors of light: blue, green, and red. It is preferred that the red color filter show a maximum value of transmittance at a wavelength of 590 nm to 780 nm, the green color filter show a maximum value of a transmittance at a wavelength of 520 nm to 580 nm, and the blue color filter show a maximum value of a transmittance at a wavelength of 400 nm to 480 nm. It is preferred that the maximum transmittance of each color be 80% or more.

The liquid crystal layer 5 contains liquid crystal molecules aligned homogeneously. Herein, the "homogeneous alignment" refers to the state in which the alignment vector of the liquid crystal molecules is aligned in parallel with the substrate plane and uniformly. In the present specification, the homogeneous alignment also includes the case where the liquid crystal molecules are slightly tilted with respect to the glass substrate plane, i.e., the case where the liquid crystal molecules have a pretilt angle.

Since the liquid crystal layer 5 includes liquid crystal molecules aligned homogeneously, when it is assumed that a refractive index of a slow axis in a plane is nx, a refractive index of a fast axis in the plane is ny, and the thickness of the liquid crystal layer is d, an in-plane retardation represented by $$Re = (nx - ny) \times d \quad (6)$$

occurs in the liquid crystal layer 5. Such a retardation can be set by changing the thickness d of the liquid crystal layer. More specifically, by setting the thickness $d_B$ of the region in contact with the surface of the blue color filter 6B to be sufficiently smaller than the thickness $d_G$ of the region in contact with the surface of the green color filter 6G, an in-plane retardation Re[550] in light with a wavelength of 550 nm can be set to be larger than an in-plane retardation Re[450] at a wavelength of 450 nm.

Specific examples of the liquid crystals used for the above-mentioned IPS mode include nematic liquid crystals. Any suitable nematic liquid crystals may be employed as the above nematic liquid crystals depending on the purpose. For example, the nematic liquid crystals may have positive dielectric anisotropy or negative dielectric anisotropy. A specific example of the nematic liquid crystals having positive dielectric anisotropy includes "ZLI-4535" (trade name, manufactured by Merck Ltd.). A specific example of the nematic liquid crystals having negative dielectric anisotropy includes "ZLI-2806" (trade name, manufactured by Merck Ltd.). Further, a difference between an ordinary refractive index (no) and an extraordinary refractive index (ne), that is, a birefringent index ($\Delta n_{LC}$) of the above-mentioned nematic liquid crystals can be appropriately set in accordance with the response speed, transmittance, and the like of the above-mentioned liquid crystals. The birefringent index is preferably 0.05 to 0.30, in general.

In the IPS mode, homogeneously aligned nematic liquid crystals in the absence of an electric field respond in such an electric field as parallel to substrates generated between a counter electrode and a pixel electrode each formed of metal (also referred to as a horizontal electric field) by utilizing an electrically controlled birefringence (ECB) effect. To be more specific, for example, as described in "Monthly Display July" (p. 83 to p. 88, published by Techno Times Co., Ltd., 1997) or "Ekisho vol. 2, No. 4" (p. 303 to p. 316, published by Japanese Liquid Crystal Society, 1998), a normally black mode provides completely black display in the absence of an electric field by: adjusting an alignment direction of the liquid crystal cell without application of an electric field, to a direction of an absorption axis of one polarizer; and arranging polarizing plates above and below the liquid crystal cell to be perpendicular to each other. Under application of an electric field, liquid crystal molecules rotate while remaining parallel to substrates, to thereby obtain a transmittance in accordance with a rotation angle. Note that the IPS mode includes super in-plane switching (S-IPS) mode and advanced super in-plane switching (AS-IPS) mode each employing a V-shaped electrode, a zigzag electrode, or the like. Examples of a commercially available liquid crystal display apparatus of such IPS mode include: 20V-type wide liquid crystal television "Wooo" (trade name, manufactured by Hitachi, Ltd.); 19-type liquid crystal display "ProLite E481S-1" (trade name, manufactured by Iiyama Corporation); and 17-type TFT liquid crystal display "FlexScan L565" (trade name, manufactured by Eizo Nanao Corporation).

The first polarizer 1 is placed so that an absorption axis direction thereof is substantially parallel to (i.e., 0°±2°) the alignment direction (initial alignment direction) of the liquid crystal layer 5 under no voltage application. Further, the second polarizer 8 is placed so that the absorption axis direction thereof is substantially perpendicular to (i.e., 90°±2°) the alignment direction of the liquid crystal layer 5. Thus, the first polarizer 1 and the second polarizer 8 are placed so as to be substantially perpendicular to each other. Two polarizers are placed in such an arrangement, whereby the liquid crystal panel 200 functions as an IPS liquid crystal panel in an e-mode. As the first polarizer 1 and the second polarizer 8, any polarizers may be used. Further, a polarizing plate with a protective film on one side or both sides of the polarizer may be used. As a commercially available polarizing plate, there are "NPF•SEG1224DU" (trade name) manufactured by Nitto Denko Corporation and the like.

The retardation film 2 is a retardation film called a so-called negative C plate characterized in that there is no difference in refractive index in an in-plane direction, and the refractive index in a thickness direction is smaller than the refractive index in an in-plane direction. That is, the retardation film 2 is a film that satisfies the relationship:

$$nx=ny>nz \quad (7)$$

assuming that the refractive index of the slow axis of the retardation film 2 is nx, the refractive index of the fast axis is ny, and the refractive index in a thickness direction is nz. In Expression (7), there is no difference in refractive index in an in-plane direction, so that the refractive index nx of the slow axis and the refractive index ny of the fast axis are equal, and larger than the refractive index nz in a thickness direction. Even in the case where there is a difference of 10 nm or less in the refractive index nx and the refractive index ny, the refractive index nx and the refractive index ny are considered to be substantially equal, and thus, Expression (7) is assumed to hold. Therefore, even a retardation film, in which there is a difference of 10 nm or less in the refractive index nx and the refractive index ny, is assumed to be included in the negative C plate, providing that the refractive index in a thickness direction is smaller than the refractive index in an in-plane direction.

The retardation film 2 is the film, in which a thickness direction retardation value Rth[550] of the retardation film with respect to light with a wavelength of 550 nm that is green light is represented by $$Rth[550]=(nx_{550}-nz_{550}) \times d \quad (4)$$

where $nx_{550}$ is a principal refractive index in a slow axis direction in a plane of the retardation film with respect to light with a wavelength of 550 nm, $nz_{550}$ is a principal refractive index in a thickness direction of the retardation film with respect to light with a wavelength of 550 nm, and d is a thickness of the retardation film; and the retardation value $Rth[550]$ preferably is in a range of 20 nm $\leq Rth[550] \leq$ 80 nm. (5)

When Rth[550] is smaller than 20 nm, a contrast in an oblique direction may be decreased. When Rth[550] is larger than 80 nm, a color shift in an oblique direction may be increased. As represented by Expression (5), when Rth[550] of the retardation film is 20 nm to 80 nm, a contrast in an oblique direction can be enhanced while a color shift in an oblique direction is suppressed. Rth[550] of the retardation film is more preferably 20 nm to 60 nm, and particularly preferably 30 nm to 50 nm.

The retardation film can be formed of any suitable material as long as the above-mentioned properties can be obtained. A specific example of the material forming the retardation film includes a non-liquid crystalline material. A non-liquid crystalline polymer is particularly preferred. Unlike the liquid crystalline material, such a non-liquid crystalline material can form a film exhibiting optical uniaxiality of nx=ny>nz due to the properties thereof, irrespective of the alignment property of a substrate. As the non-liquid crystalline material, for example, polymers such as polyamide, polyimide, polyester, polyetherketone, polyamideimide, and polyesterimide are preferred because of excellent heat resistance, drug resistance, and transparency, and superior stiffness. Any one kind of these polymers may be used, or may be used as a mixture of at least two kinds having different functional groups, such as a mixture of polyaryl ether ketone and polyamide. Among such polymers, polyimide is particularly preferred because of high transparency, high alignment property, and high stretchability.

As a specific example of the polyimide and a specific example of a method of forming the retardation film, there are polymers and a method of producing an optical compensation film described in JP 2004-46065 A.

The thickness of the retardation film can be set to be any suitable value. In the case where the retardation film is formed of a non-liquid crystalline material, the thickness of the retardation film is preferably 0.5 to 10 µm, more preferably 0.5 to 8 µm, and much more preferably 0.5 to 5 µm.

Another specific example of the retardation film includes a cholesteric alignment fixed layer. The term "cholesteric alignment fixed layer" refers to a layer in which constituent molecules of the layer have a helical structure, a helical axis thereof is aligned substantially perpendicularly with respect to a plane direction, and an alignment state thereof is fixed. Thus, the "cholesteric alignment fixed layer" includes not only the case where a liquid crystal compound exhibits a cholesteric liquid crystal phase, but also the case where a non-liquid crystal compound has a pseudo structure as in a cholesteric liquid crystal phase. For example, the "cholesteric alignment fixed layer" can be formed by allowing a liquid crystal material to be aligned in a cholesteric structure (helical structure) by providing the liquid crystal material with distortion, using a chiral agent in a state where the liquid crystal material exhibits a liquid crystal phase, and subjecting the liquid crystal material in this state to polymerization or cross-linking treatment, thereby fixing the alignment (cholesteric structure) of the liquid crystal material.

A specific example of the cholesteric alignment fixed layer includes a cholesteric layer described in JP 2003-287623 A.

The thickness of the retardation film can be set to be any suitable value. In the case where the retardation film is a cholesteric alignment fixed layer, the thickness of the retardation film is preferably 0.5 to 10 µm, more preferably 0.5 to 8 µm, and much more preferably 0.5 to 5 µm.

Other specific examples of the material forming the retardation film include polymer films formed of a cellulose-based resin such as triacetylcellulose (TAC), norbornene-based resin, and the like. As the retardation film, a commercially available film can be used as it is. Further, a commercially available film subjected to a secondary treatment such as stretching and/or shrinkage can be used. Examples of the commercially available film include Fujitac series (ZRF80S, TD80UF, TDY-80UL (trade name)) manufactured by Fuji Photo Film Co., Ltd., "KC8UX2M" (trade name) manufactured by Konica Minolta Opt Product, "Zeonor" (trade name) manufactured by Nippon Zeon Co., Ltd., and "Arton" (trade name) manufactured by JSR Corporation. As a stretching method capable of satisfying the optical properties, there is, for example, biaxial stretching (longitudinal and transverse equal magnification stretching).

The thickness of the retardation film can be set to be any suitable value. In the case where the retardation film is a polymer film formed of a cellulose-based resin, a norbornene-based resin, or the like, the thickness of the retardation film is preferably 45 to 105 µm, more preferably 50 to 95 µm, and much more preferably 55 to 90 µm.

Still another specific example of the retardation film includes a laminate having the cholesteric alignment fixed layer and a plastic film layer. Examples of the resin forming the plastic film layer include a cellulose-based resin and a norbornene-based resin. These resins are as described above.

As a method of laminating the cholesteric alignment fixed layer and the plastic film layer, any suitable method can be adopted. Specifically, there are a method of transferring the cholesteric alignment fixed layer onto the plastic layer, a method of attaching a cholesteric alignment fixed layer previously formed on a base to a plastic film layer via an adhesive layer, and the like. As an adhesive forming the adhesive layer, typically, there is a curable adhesive. Typical examples of the curable adhesive include a photocurable adhesive such as a UV-curable type, a moisture-curable adhesive, and a heat-curable adhesive. The thickness of the adhesive layer is preferably 1 µm to 10 µm, and more preferably 1 µm to 5 µm.

Next, the mechanism in which a contrast in an oblique direction is enhanced in the above embodiment will be described below with reference to FIGS. 3 to 5.

Figure 3A:
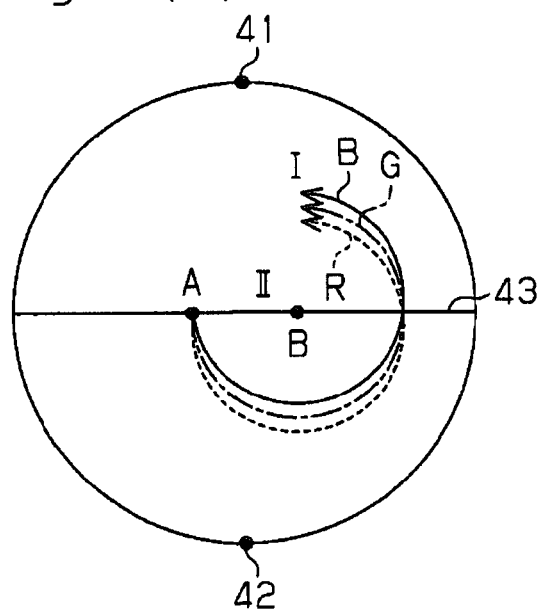
FIG. 3 A schematic view illustrating the effects of the liquid crystal panel according to the present invention: (a) is a view illustrating a change in polarization in a liquid crystal panel having a multi-gap structure; and (b) is a view illustrating a change in polarization in a liquid crystal panel having no multi-gap structure.
Figure 3B:
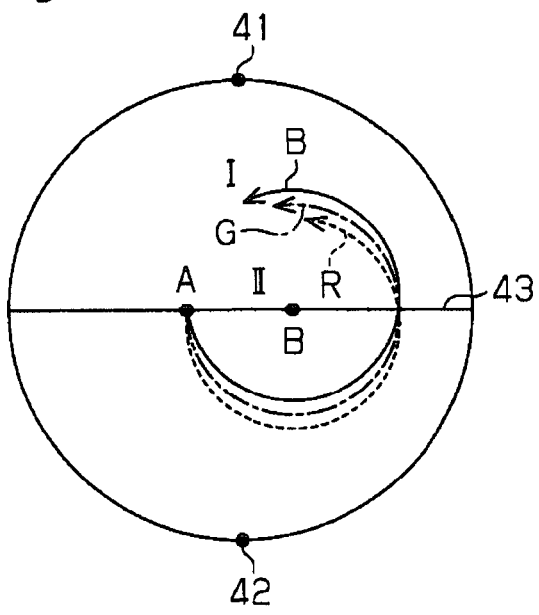

FIGS. 3(a) and 3(b) show Poincare spheres used for understanding the polarization state further schematically in a plane. When description is made by allowing the figures to simulate the earth, a straight line 43 drawn at the center corresponds to the equator. Further, a point 41 corresponds to the North Pole, and a point 42 corresponds to the South Pole. Herein, the entire polarization state can be represented by any points on the surfaces of the Poincare spheres, the North Pole represents right-handed circularly polarized light, the South Pole represents left-handed circularly polarized light, the entire equator represents linearly polarized light, the entire portion of the Northern Hemisphere represents right elliptically polarized light, and the entire portion of the South Hemisphere represents left elliptically polarized light.

Further, a point A represents the position of linearly polarized light having passed through the second polarizer. A point B represents an ideal position of polarized light on a viewer side, and when the polarized light having passed through the first polarizer moves to the point B, the contrast in an oblique direction becomes largest and the color shift in an oblique direction becomes smallest.

First, the movement of polarized light in a liquid crystal panel in an e-mode of an IPS mode having no multi-gap structure will be described with reference to FIG. 3(b). Since the absorption axis direction of the second polarizer is perpendicular to the alignment direction of the liquid crystal layer, the linearly polarized light represented by the point A rotates counterclockwise with respect to the point B when passing through the liquid crystal layer 5 and moves to a point I. At this time, the refractive index in the liquid crystal layer varies dependent upon the color. Therefore, blue polarized light represented by a symbol B in the figure moves most largely, and then, green polarized light represented by a symbol G and red polarized light represented by a symbol R move less in this order. Thus, arrival points vary depending upon the light color, so that a color shift in an oblique direction occurs.

Next, the movement of polarized light in a liquid crystal panel in an e-mode of an IPS mode having a multi-gap structure will be described with reference to FIG. 3(a). The linearly polarized light represented by the point A rotates counterclockwise with respect to the point B, and moves to the point I. At this time, although the refractive index in the liquid crystal layer varies depending upon the color, the thickness of the liquid crystal layer is set for each color, so that a retardation is suppressed. Thus, the arrival points are substantially the same, so that a color shift in an oblique direction is suppressed.

However, in any of the liquid crystal panel, the point I is far away from the point B at the ideal position of polarized light on a viewer side, so that a contrast in an oblique direction becomes low.

Figure 4A:
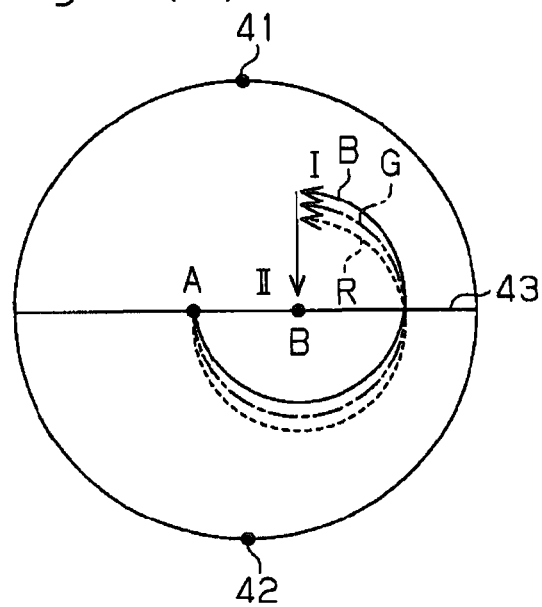
FIG. 4 A schematic view illustrating the effects of the liquid crystal panel according to the present invention: (a) is a view illustrating a change in polarization when a retardation film is added to the liquid crystal panel having a multi-gap structure; and (b) is a view illustrating a change in polarization when a retardation film is added to the liquid crystal panel having no multi-gap structure.
Figure 4B:
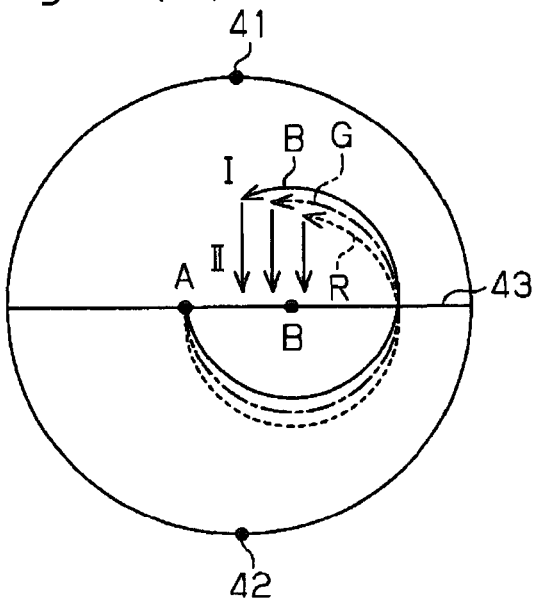

As shown in FIG. 4, in the present embodiment, a negative C plate is further provided between the liquid crystal cell and the first polarizer, so that polarized light output from the liquid crystal cell perpendicularly moves in the South Pole direction to reach a point II. Then, as shown in FIG. 4 (a), a color shift in an oblique direction is suppressed by the multi-gap structure, the polarized light having reached the point I moves in the South Pole direction by the negative C plate, and the arrival point II is substantially matched with the point B at the ideal position of polarized light on a viewer side. On the other hand, in the example having no multi-gap structure, as shown in FIG. 4(b), arrival points II are not converged at one point, so that a color shift in an oblique direction is not suppressed. On the other hand, the point II is close to the point B at the ideal position of polarized light on a viewer side, so that the contrast in an oblique direction is considered to be enhanced.

Figure 5A:
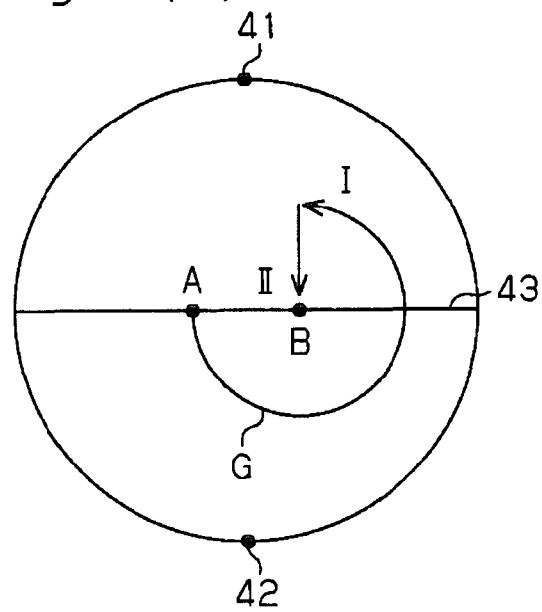
FIG. 5 A schematic view illustrating the effects of the liquid crystal panel according to the present invention: (a) is a view illustrating a change in polarization in the liquid crystal panel in the present embodiment; and (b) is a view illustrating a change in polarization in a liquid crystal panel in which the arrangement of the retardation film is changed.
Figure 5B:
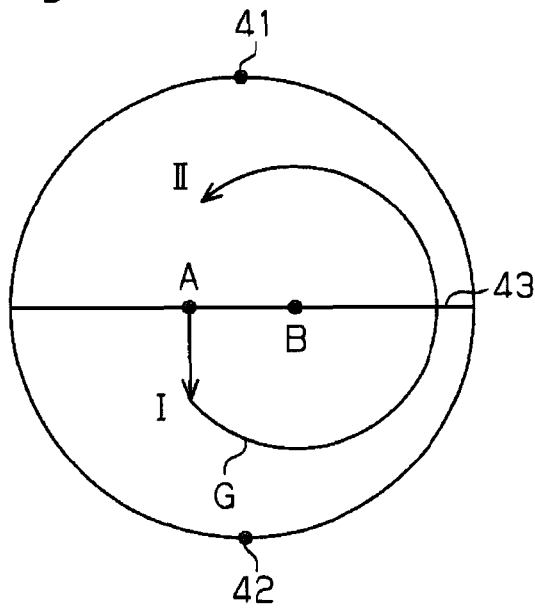

Regarding a liquid crystal panel having a negative C plate, the difference in effects depending upon the arrangement of the negative C plate will be described with reference to FIGS. 5(a) and 5(b). As shown in FIG. 5(a) again, in the case where a negative C plate is provided between the liquid crystal cell 10 and the first polarizer 1, the light arrival point II is substantially matched with the point B at the ideal position of polarized light on a viewer side, so that a color shift in an oblique direction is suppressed, and a contrast in an oblique direction is enhanced. As shown in FIG. 5(b), in the case where a negative C plate is provided between the second polarizer and the liquid crystal cell, linearly polarized light having passed through the second polarizer first moves in the South Pole direction to reach the point I. After that, the light rotates counterclockwise with respect to the point B to reach the point II. The point II at this time is far away from the point B at the ideal position of polarized light, so that a contrast in an oblique direction decreases. Thus, it is shown that even in liquid crystal panels having the same negative C plate, the effects vary depending upon the arrangement of the negative C plate.

In the liquid crystal display apparatus of the above embodiment, the following effects can be obtained.

(1) In the above embodiment, the liquid crystal cell 10 has a multi-gap structure. Thus, a color shift in an oblique direction is suppressed compared with the configuration having no multi-gap structure.

(2) Further, the retardation film 2 which has no difference in refractive index in an in-plane direction and whose refractive index in a thickness direction is smaller than a refractive index in an in-plane direction, i.e., a negative C plate, is provided between the liquid crystal cell 10 and the first polarizer 1. Therefore, linearly polarized light generated when light passes through the second polarizer 8 is converted into elliptically polarized light by the liquid crystal layer 5, returned to linearly polarized light by the negative C plate, and then, passes through the first polarizer 1, so that a contrast in an oblique direction is enhanced.

(3) In the above embodiment, the thickness of a plurality of color filters 6 is set for each of the color filters 6B, 6G, 6R of particular colors. Since the distance between two glass substrates 3 and 7 constituting the liquid crystal cell 10 is constant, the thicknesses $d_B$, $d_G$, $d_R$ of the liquid crystal layer 5 can be set easily by setting each thickness of the color filters 6B, 6G, 6R. The refractive index of liquid crystal is the same in any region, so that a retardation can be set by setting the thicknesses $d_B$, $d_G$, $d_R$ of the liquid crystal layer 5. That is, the retardation of a liquid crystal cell can be set for each light color by a easy method of setting each thickness of the color filters 6B, 6G, 6R, so that a color shift in an oblique direction can be suppressed easily.

(4) In the above embodiment, the thickness $d_B$ of the liquid crystal layer 5 in contact with the blue color filter 6B is smaller than each of the thickness $d_G$ and the thickness $d_R$ of the liquid crystal layers 5 in contact with the green color filter 6G and the red color filter 6R, so that the retardation in phase of blue light can be set to be smaller than those of green light and red light. Thus, the green light passing through the liquid crystal layer 5 causes a retardation in phase with respect to the blue light. Accordingly, the retardation in phase of the blue light with respect to the green light, occurring in the retardation film 2, can be offset.

(5) In the above embodiment, the thickness direction retardation value Rth[550] regarding light with a wavelength of 550 nm of the retardation film 2 of the liquid crystal panel 200 is 20 nm to 80 nm. Therefore, a contrast in an oblique direction can be enhanced while a color shift in an oblique direction is suppressed.

The above embodiment may be modified as follows.

A plurality of color filters to be used are not limited to only three colors: blue, green, and red. For example, a filter of another color such as deep red may further be provided. By adding a filter other than the filters of three primary colors, display of an intermediate color can be performed more easily.

In the above embodiment, although the thickness of the liquid crystal layer 5 in a region where the green color filter and the red color filter are in contact is varied, the thickness may be the same. This is because the difference in refractive index in the liquid crystal layer 5 between the green light and the red light is small, and hence, actually, it is not necessarily required to adjust a retardation by changing the thickness $d_G$ and the thickness $d_R$ of the liquid crystal layer 5. However, if the thickness $d_G$ and the thickness $d_R$ can be set strictly, it is considered that a color shift in an oblique direction can be suppressed more by setting the thickness $d_G$ to be different from the thickness $d_R$.

Figure 8:
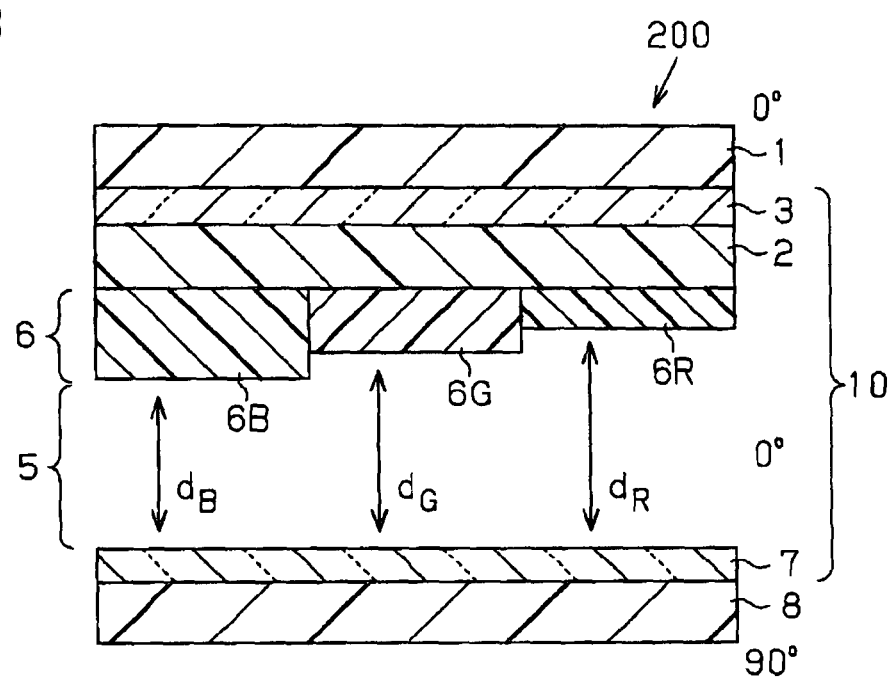
FIG. 8 A schematic cross-sectional view showing a variation example of the liquid crystal panel according to the present invention.

In the above example, although the retardation film 2 is placed between the first polarizer 1, and the liquid crystal cell 10, the retardation film 2 may be provided between the glass substrate 3 and the color filter 6, as shown in FIG. 8. Even in such a configuration, linearly polarized light generated when light passes through the second polarizer 8 can be converted into elliptically polarized light in the liquid crystal layer 5, and the elliptically polarized light can be returned to linearly polarized light by the retardation film 2. The linearly polarized light has a polarization direction perpendicular to the absorption axis of the first polarizer 1, so that a contrast in an oblique direction is enhanced. That is, the retardation film 2 may be placed at any position between the color filter 6 and the first polarizer 1.

In the above example, the case where a direct-lighting type is adopted as a backlight unit is shown. However, the backlight unit may be of, for example, a sidelight type. In the case where the sidelight type is adopted, at least a light-guiding plate and a light reflector are provided in addition to the above configuration.

In the above example, the liquid crystal display apparatus is of a transmission type in which a back surface of a liquid crystal panel is irradiated with light, whereby a screen is viewed. However, the liquid crystal display apparatus may be of a reflection type in which light is irradiated from a viewer side of a liquid crystal panel, whereby a screen is viewed. Alternatively, the liquid crystal display apparatus may be of a semi-transmission type having both a transmission type property and a reflection type property.

Example 1

The embodiments described above will be described more specifically by way of examples, and the effects thereof will be confirmed.

Liquid Crystal Cell Having a Multi-Gap Structure

A coloring resin solution with a pigment dispersed therein was applied to a glass substrate on which a black matrix was formed, and pre-baked and dried, whereby a coloring resin layer was formed. Then, a positive resist was applied to the coloring resin layer, and the resultant was exposed to light through a photomask, and the positive resist was developed with a developing solution, and the coloring resin layer was etched. Then, the positive resist was peeled. In order to form a red color filter, a green color filter, and a blue color filter, the above operation was repeated three times, and the thickness of the coloring resin layer (color filter) of each color is changed, whereby a color filter substrate 3 was produced.

Next, thin film transistors, scanning lines, signal lines, and pixel electrodes were formed on another glass substrate to produce an active matrix substrate 7. Alignment films were formed on two substrates, and the surfaces thereof were rubbed with a rubbing cloth in one direction.

Next, spherical fine particles (spacers) were scattered on the active matrix substrate 7. On the other hand, an epoxy resin adhesive was applied to the peripheral portion of an effective display region of the color filter substrate 3 except for an opening for injecting liquid crystal by screen printing. After that, the active matrix substrate and the color filter substrate were laminated with each other, and bonded to each other by heating under pressure, whereby a void cell with a cell gap of $d_B$ of 3.0 μm, $d_G$ of 3.5 μm, and $d_R$ of 3.5 μm corresponding to a color filter of each color.

Nematic liquid crystal was injected into the void cell by a vacuum injection method, and the injection port for liquid crystal was sealed with a UV-curable resin after the injection, whereby a liquid crystal cell of an IPS mode was produced. The injected nematic liquid crystal is a liquid crystal in which, assuming that a refractive index in a slow axis direction is nx and a refractive index in a direction perpendicular to the slow axis is ny, the difference in refractive index represented by $\Delta n = nx - ny$ is 0.124 regarding light with a wavelength of 550 nm and dielectric anisotropy is positive. Re of light with a wavelength of 450 nm under no voltage application of the liquid crystal cell thus formed was 360 nm, Re of light with a wavelength of 550 nm thereof was 434 nm, and Re of light with a wavelength of 650 nm thereof was 434 nm.

Polarizer

A commercially available polarizing plate [NPF-SIG1423DU (manufactured by Nitto Denko Corporation)] was used as it is. The polarizing plate includes protective films that are substantially isotropic on both sides of a polarizer. The first and second polarizing plates were the same, and only absorption axis directions were allowed to be perpendicular to each other as shown in FIG. 2.

Negative C Plate

A method of producing a negative C plate is as follows.

Regarding a negative C plate with Rth[550]=20 nm

To a reaction container (500 mL) equipped with a mechanical stirring device, a Dean and Stark device, a nitrogen guide tube, a thermometer, and a cooling tube, 17.77 g (40 mmol) of 2,2'-bis(3,4-dicarboxylphenyl)hexafluoropropanoic dianhydride [manufactured by Clariant (Japan) K.K.] and 12.81 g (40 mmol) of 2,2-bis(trifluoromethyl)-4,4'-diaminobiphenyl [manufactured by Wakayama Seika Corporation] were added. Then, a solution in which 2.58 g (20 mmol) of isoquinoline was dissolved in 275.21 g of m-cresol was added to the mixture, followed by stirring (600 rpm) at 23° C. for one hour, whereby a uniform solution was obtained. Next, the reaction container was raised in temperature so that the temperature in the reaction container became 180±3° C., using an oil bath, followed by stirring for 5 hours while the temperature was kept, whereby a yellow solution was obtained. After the solution was further stirred for 3 hours, heating and stirring were stopped, and the solution was allowed to be cooled to room temperature, whereby the polymer was precipitated as a gel.

Acetone was added to the yellow solution in the above reaction container to dissolve the above gel completely, whereby a diluted solution (7% by weight) was produced. When the diluted solution was added little by little to 2 L of isopropyl alcohol while stirring, white powder was precipitated. The powder was filtered out, and washed by being put in 1.5 L of isopropyl alcohol. The powder was further washed again by repeating the same operation, and thereafter, the powder was filtered out again. The resultant powder was dried in an air-circulating thermostatic oven at 60° C. for 48 hours, and then, dried at 150° C. for 7 hours, whereby polyimide composed of a repeating unit represented by the following formula (8) was obtained as white powder (yield: 85%). The weight average molecular weight (Mw) of the above polyimide was 124,000, and the imidization ratio was 99.9%.

A polyimide solution (15% by weight) in which the above polyimide was dissolved in methyl isobutyl ketone was applied to the surface of a polyethylene terephthalate film [Lumira S27-E (trade name), manufactured by Toray Industries, Inc.] with a rod coater in one direction, and dried for 5 minutes in an air circulating thermostatic oven at 130±1° C., whereby a polyimide layer with a thickness of 0.5 μm was formed. The polyethylene terephthalate film was peeled, and the optical properties of the polyimide layer were measured. As a result, a refractive index ellipsoid exhibited a relationship of nx=ny>nz, a transmittance was 90%, an average refractive index was 1.55, a thickness direction retardation Rth at a wavelength of 550 nm was 20 nm, and the difference between a thickness direction refractive index and an in-plane direction refractive index $\Delta nxz = nx - nz$ was 0.04.

[Chemical Formula 1]

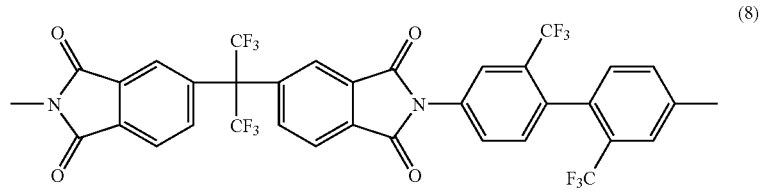

(8)

The second polarizing plate, liquid crystal cell, negative C plate, and first polarizing plate were laminated in this order via an acrylic pressure-sensitive adhesive layer, whereby a liquid crystal panel of an E-mode shown in FIG. 2 was formed. The liquid crystal panel was combined with a backlight unit to produce a liquid crystal display apparatus shown in FIG. 1.

Example 2

Example 2 is the same as Example 1, except that the negative C plate of Rth[550]=40 nm was used, so that the description thereof will be omitted. Further, the method of producing a negative C plate is the same as that in Example 1, except that the thickness of the polyimide layer after being dried was set to be 1 μm, so that the description thereof will be omitted.

Example 3

Example 3 is the same as Example 1, except that the negative C plate of Rth[550]=60 nm was used, so that the description thereof will be omitted. Further, the method of producing a negative C plate is the same as that in Example 1, except that the thickness of the polyimide layer after being dried was set to be 1.5 μm, so that the description thereof will be omitted.

Example 4

Example 4 is the same as Example 1, except that the negative C plate of Rth[550]=80 nm was used, so that the description thereof will be omitted. Further, the method of producing a negative C plate is the same as that in Example 1, except that the thickness of the polyimide layer after being dried was set to be 2 μm, so that the description thereof will be omitted.

Comparative Example 1

Figure 6:
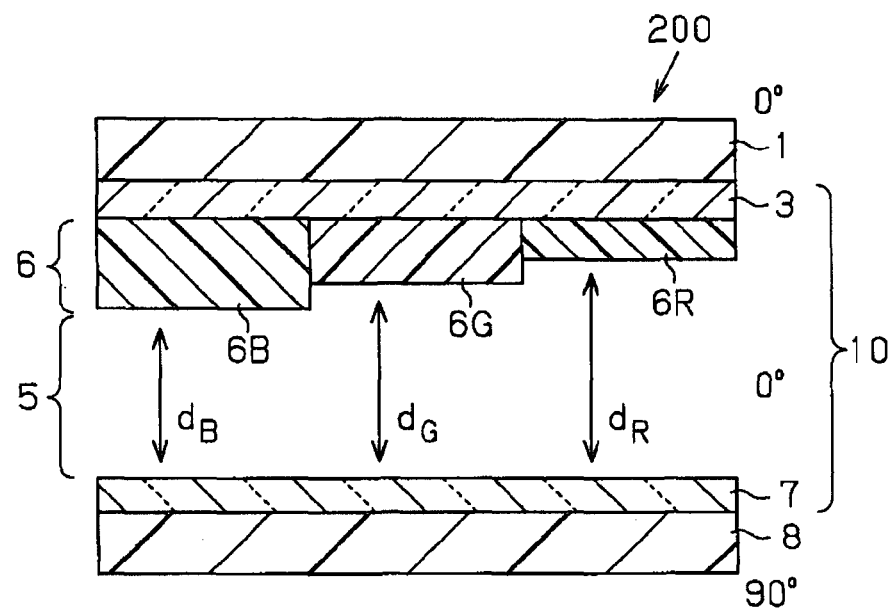
FIG. 6 A schematic cross-sectional view showing a liquid crystal display apparatus according to a comparative example.

Comparative Example 1 is the same as Example 2, except that the negative C plate was not used, as shown in FIG. 6, so that the description thereof will be omitted.

Comparative Example 2

Figure 7:
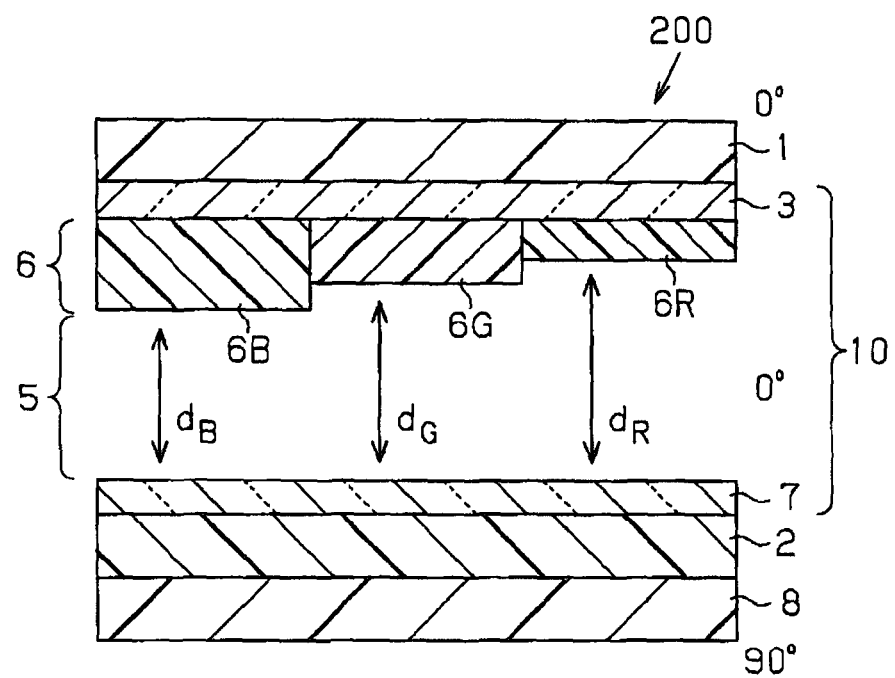
FIG. 7 A schematic cross-sectional view showing a liquid crystal display apparatus according to another comparative example.

Comparative Example 2 is the same as Example 1, except that the negative C plate was provided between the second polarizer 8 and the liquid crystal cell 10, as shown in FIG. 7, so that the description thereof will be omitted.

[Measurement Method]

(1) Retardation Value (Re [λ], Rth [λ], λ Represents a Wavelength of Transmissive Light)

Retardation values were measured at 23° C. by using "KOBRA21-ADH" (trade name, manufactured by Oji Scientific Instruments). Note that average refractive index was measured by using Abbe Refractometer "DR-M4" (trade name, manufactured by ATAGO CO., LTD.)

(2) Thickness

In the case where the thickness was less than 10 μm, the thickness was measured by using a spectrophotometer for thin film "Multi Channel Photo Detector MCPD-2000" (trade name, manufactured by Otsuka Electronics Co., Ltd.). In the case where the thickness was 10 μm or more, the thickness was measured by using a digital micrometer "KC-351C-type" (trade name, manufactured by Anritsu Corporation).

(3) Contrast Ratio in Oblique Direction of Liquid Crystal Display Apparatus

After the elapse of 30 minutes from the lighting of a backlight at a dark room at 23° C., a Y-value of an XYZ-display system in the case where a white image and a black image were displayed at an azimuth angle of 0° to 360° and a polar angle of 60° of a display screen were measured, using "EZ Contrast160D" (trade name) manufactured by ELDIM SA. From the Y-value (YW) in the white image and the Y-value (YB) in the black image, a contrast ratio [YW/YB] in an oblique direction was calculated. The long side of the liquid crystal panel was set to be an azimuth angle of 0°, and the normal direction was set to be a polar angle of 0°.

(4) Method of Measuring Color Shift Amount (Δxy) in Oblique Direction of Liquid Crystal Display Apparatus:

After the elapse of 30 minutes from the lighting of a backlight at a dark room at 23° C., a measurement was conducted. Specifically, a liquid crystal display apparatus was allowed to display a black image, and a hue, an x-value, and a y-value at an omniazimuth (0° to 360°) and a polar angle of 60° of a display screen were measured by "EZ Contrast160D" (trade name) manufactured by ELDIM SA. A color shift amount (Δxy value) in an oblique direction was calculated by the following Expression: $\{(X-0.313)^2+(y-0.329)^2\}^{1/2}$. The long side direction of the liquid crystal panel was set to be an azimuth angle of 0°, and the normal direction of the liquid crystal panel was set to be a polar angle of 0°. X=0.313 and y=0.329 show a black color without a coloring in the case where a black image is displayed on a display screen.

[Results and Evaluation]

The display properties of the liquid crystal display apparatus are shown in the following table.

TABLE 1

| | Negative C plate | Contrast in oblique direction |
|---|---|---|
| Example 2 | Between liquid crystal layer and first polarizer, 40 nm | 136 |
| Comparative Example 1 | Not used | 79 |
| Comparative Example 2 | Between liquid crystal layer and second polarizer, 40 nm | 73 |

It is understood that the contrast in an oblique direction is enhanced in Example 2, compared with Comparative Example 1 having no negative C plate. Further, when Comparative Example 2 is compared with Example 2, it is understood that, even if a negative C plate is provided, a contrast in an oblique direction is not enhanced due to the different arrangement (rather degraded compared with Comparative Example 1).

TABLE 2

| | Rth | Contrast in oblique direction | Color shift in oblique direction |
|---|---|---|---|
| Example 1 | 20 nm | 106 | 0.07 |
| Example 2 | 40 nm | 136 | 0.11 |
| Example 3 | 60 nm | 158 | 0.14 |
| Example 4 | 80 nm | 157 | 0.17 |

When Examples 1-4 are compared, a contrast in an oblique direction increases as Rth increases, which is preferred. On the other hand, a value of a color shift in an oblique direction increases as Rth increases, and the color shift is degraded. Thus, in the case where Rth is smaller than 20 nm, a contrast in an oblique direction is enhanced insufficiently, and in the case where Rth is larger than 80 nm, a color shift in an oblique direction is degraded, so that Rth is preferably 20 nm to 80 nm. Rth is more preferably 20 nm to 60 nm, and particularly preferably 30 nm to 50 nm.

INDUSTRIAL APPLICABILITY

The liquid crystal panel and the liquid crystal display apparatus in the present embodiment may be used for any suitable applications such as: OA devices such as a personal computer monitor, a laptop personal computer, and a copying machine; portable devices such as a cellular phone, a watch, a digital camera, a personal digital assistance (PDA), and a portable game machine; household electric appliances such as a video camera, a television, and a microwave oven; in-car devices such as a backmonitor, a car navigation system monitor, and a car audio; display devices such as an information monitor for commercial stores; security devices such as a surveillance monitor; and nursing care/medical devices such as a nursing monitor and a medical monitor.

The invention claimed is:

1. A liquid crystal panel, comprising:
a liquid crystal cell having a plurality of color filters having different colors and a liquid crystal layer which is provided in contact with the plurality of color filters, in which different thicknesses are set depending upon a region in contact with each of the plurality of color filters, and which further contains liquid crystal molecules aligned homogeneously, wherein the plurality of color filters comprise a green color filter and a blue color filter;

a first polarizer which is provided on a side of the plurality of color filters of the liquid crystal cell, and whose absorption axis is directed in a direction substantially parallel to a major axis direction of the liquid crystal molecules under no voltage application;

a second polarizer which is provided on a side of the liquid crystal layer of the liquid crystal cell, and whose absorption axis is directed in a direction substantially perpendicular to the major axis direction of the liquid crystal molecules; and only one retardation film, such retardation film being provided between the first polarizer and the plurality of color filters, and having an in-plane direction refractive index that is substantially uniform and a thickness direction refractive index that is smaller than the in-plane direction refractive index, wherein the second polarizer is placed on a light source side;

a thickness direction retardation value Rth[550] of the retardation film with respect to light with a wavelength of 550 nm that is green light is represented by $$Rth[550]=(nx_{550}-nz_{550})\times d$$

where $nx_{550}$ is a principal refractive index in a slow axis direction in a plane of the retardation film with respect to light with a wavelength of 550 nm, $nz_{550}$ is a principal refractive index in a thickness direction of the retardation film with respect to light with a wavelength of 550 nm, and d is a thickness of the retardation film; and the retardation value Rth[550] is in a range of $$20\text{ nm}\leq Rth[550]\leq 80\text{ nm};$$

an in-plane retardation value Re[550] of the liquid crystal cell with respect to light with a wavelength of 550 nm that is green light is represented by $$Re[550]=(nx_{550}-ny_{550})\times d_G$$

where $nx_{550}$ is a principal refractive index in a slow axis direction in a plane of the liquid crystal layer with respect to light with a wavelength of 550 nm, $ny_{550}$ is a principal refractive index in a fast axis direction in a plane of the liquid crystal layer with respect to light with a wavelength of 550 nm, and $d_G$ is a thickness of the liquid crystal layer in a region in contact with the green color filter;

an in-plane retardation value Re[450] of the liquid crystal cell with respect to light with a wavelength of 450 nm that is blue light is represented by $$Re[450]=(nx_{450}-ny_{450})\times d_B$$

where $nx_{450}$ is a principal refractive index in a slow axis direction in a plane of the liquid crystal layer with respect to light with a wavelength of 450 nm, $ny_{450}$ is a principal refractive index in a fast axis direction in a plane of the liquid crystal layer with respect to light with a wavelength of 450 nm, and $d_B$ is a thickness of the liquid crystal layer in a region in contact with the blue color filter; and the in-plane retardation value Re[550] and the in-plane retardation value Re[450] satisfy a relationship of $$Re[450]<Re[550].$$

2. The liquid crystal panel according to claim 1, wherein a thickness of the liquid crystal layer is set corresponding to each thickness of the plurality of color filters.

3. The liquid crystal panel according to claim 1, wherein the plurality of color filters comprise a blue color filter, a green color filter, and a red color filter, a thickness of the liquid crystal layer in a region in contact with the blue color filter is smaller than a thickness of the liquid crystal layer in a region in contact with the green color filter and the red color filter, and a thickness of the liquid crystal layer in a region corresponding to the green color filter is equal to or smaller than a thickness of the liquid crystal layer in a region corresponding to the red color filter.

4. The liquid crystal panel according to claim 3, wherein the thickness of the liquid crystal layer corresponding to the blue color filter has a thickness of 2.5 μm or more and less than 3.3 μm.

5. The liquid crystal panel according to claim 3, wherein the thickness of the liquid crystal layer corresponding to the green color filter has a thickness of 3.3 μm to 3.8 μm.

6. The liquid crystal panel according to claim 3, wherein the thickness of the liquid crystal layer corresponding to the red color filter has a thickness of 3.3 μm to 4.0 μm.

7. The liquid crystal panel according to claim 3, wherein the blue color filter has a maximum value of a transmittance at a wavelength of 400 nm to 480 nm.

8. The liquid crystal panel according to claim 3, wherein the green color filter has a maximum value of a transmittance at a wavelength of 520 nm to 580 nm.

9. The liquid crystal panel according to claim 3, wherein the red color filter has a maximum value of a transmittance at a wavelength of 590 nm to 780 nm.

10. The liquid crystal panel according to claim 3, wherein the plurality of color filters comprise a deep red color filter.

11. The liquid crystal panel according to claim 3, wherein the liquid crystal panel is an IPS liquid crystal panel in an e-mode.

12. A liquid crystal display apparatus comprising the liquid crystal panel according to claim 1.

13. The liquid crystal panel according to claim 1, wherein the retardation film has a refractive index profile of nx=ny>nz.

14. The liquid crystal panel according to claim 1, wherein the plurality of color filters comprise a deep red color filter.

15. The liquid crystal panel according to claim 1, wherein the liquid crystal panel is an IPS liquid crystal panel in an e-mode.

* * * * *